United States Patent [19]

Di Vita

[11] Patent Number: 4,925,472
[45] Date of Patent: May 15, 1990

[54] METHOD OF REDUCING OPTICAL-FIBER ATTENUATION

[75] Inventor: Pietro Di Vita, Turin, Italy

[73] Assignee: Cselt Centro Studi E Laboratori Telecomunicazioni S.P.A., Turin, Italy

[21] Appl. No.: 266,734

[22] Filed: Nov. 3, 1988

[30] Foreign Application Priority Data

Nov. 5, 1987 [IT] Italy .................................. 67942 A/87

[51] Int. Cl.[5] .................... C03B 37/022; C03B 37/075
[52] U.S. Cl. ........................................... 65/2; 65/3.11
[58] Field of Search ........................... 65/2, 3.11, 12

[56] References Cited

U.S. PATENT DOCUMENTS

| 3,300,288 | 1/1967 | Matthews | 65/2 |
| 3,912,478 | 10/1976 | Precly | 65/2 |
| 4,447,124 | 5/1984 | Cohen | 65/3.11 |

FOREIGN PATENT DOCUMENTS 0205154 12/1983 German Democratic Rep. ...... 65/2

Primary Examiner—Peter Kratz
Attorney, Agent, or Firm—Herbert Dubno

[57] ABSTRACT

A silica glass optical fiber is subjected to an external strain which causes vitreous matrix atoms to stabilize in a lower energy condition. In this way inhomogeneity domain sizes and as a consequence the attenuation due to Rayleigh scattering, depending on such inhomogeneity, are reduced.

11 Claims, 1 Drawing Sheet

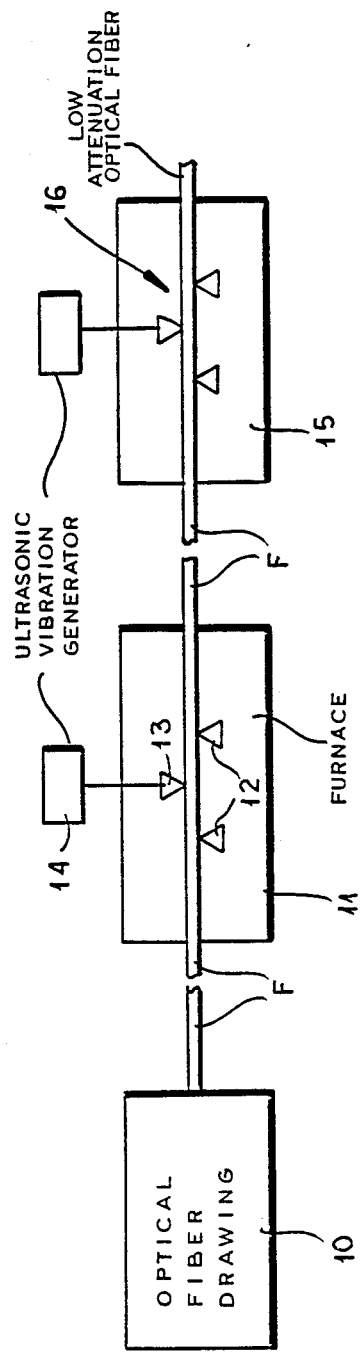

METHOD OF REDUCING OPTICAL-FIBER ATTENUATION

FIELD OF THE INVENTION

My present invention relates to optical fibers for telecommunications and, more particularly, to a method of reducing optical-fiber attenuation.

BACKGROUND OF THE INVENTION

It is known that the important optical-fiber transmissive features of principal interest for telecommunications are attenuation and dispersion, which depend upon wavelength.

Attenuation determines repeater spacing and dispersing the amount of information which can be transmitted in a unit of time.

Total attenuation in a fiber depends on various factors, some of which depend in turn on the material characteristics. Among those factors Rayleigh scattering, causing an attenuation given by the relation $\alpha_{sc} = \alpha_o \lambda^{-4}$ where $\lambda$ = wavelength and $\alpha_o$ = scattering coefficient; and; lattice bond absorption, causing an attenuation given by relation $\alpha_{abs} = A \exp(-\gamma\lambda_1/\lambda)$ where A, $\lambda$ are constants, and $\lambda_1$ is a constant of the medium (wavelength of fundamental stretch vibration of lattice bond).

These two phenomena together generate a total attenuation whose representative curve is V-shaped, with vertex substantially coinciding with the minimum attenuation point.

In case of silica-glass monomode fibers, which are the most widely used, the minimum attenuation point is close to 1.55 μm wavelength; the minimum dispersion point (at which the dispersion is basically zero) is, by contrast, about 1.27 μm, at which attenuation is about twice the minimum.

The choice of operating at either wavelength depends on the characteristics of the available sources, and corresponds to giving most importance to either repeater spacing or transmission rate, respectively. Hence the importance is clear of producing fibers in which the two minima are very closely spaced or even coincident, so as to optimize both characteristics.

The minimum dispersion point can be varied by acting on fiber material refractive-index, and silica-glass fiber production methods have been suggested in which the minimum dispersion point is shifted towards higher wavelengths and is practically made to coincide with that of minimum attenuation.

An example is described in the paper entitled: "Low-loss dispersion-shifted single mode fiber manufactured by the OVD process" presented by T. D. Croft, J. E. Ritter and V. A. Bhagavatula at the Conference on Optical Fiber Communication, San Diego (Calif., U.S.A.), paper WD2, a digest of which is published at page 94 of the conference proceedings.

The shift of minimum dispersion is obtained by successively depositing a $GeO_2$-doped silica inner core with a triangular refractive-index profile, a region of pure silica, a $GeO_2$-doped silica outer core with stepped refractive-index profile, and finally a pure silica cladding.

The known method is unsatisfactory because of its complexity, since it requires sophisticated refractive-index variations, and because of the fact that dopant addition increases the overall attenuation by comparison with a conventional fiber.

OBJECTS OF THE INVENTION

It is the principal object of my present invention to provide an improved method of reducing attenuation in an optical-glass fiber and, particularly, in an optical-glass fiber adapted to be used in communication.

Another object of this invention is to provide an improved method of making an optical-glass fiber suitable for use in communication utilizing the transmission of light through the optical fiber.

SUMMARY OF THE INVENTION

These disadvantages are overcome by the method of the present invention, which does not require complex manufacturing operations and which, by reducing attenuation due to Rayleigh scattering, allows minimum attenuation to be shifted towards the minimum dispersion region.

The invention is based on the discovery that Rayleigh scattering is due to local microfluctuations in vitreous matrix density, which become stabilized ("frozen") at the vitreous transition instant. If matrix atoms are frozen in a lower energy condition because of an external stress, the sizes of inhomogeneity domains are reduced, thereby causing an actual reduction in Rayleigh scattering.

According to the invention, such an external strain is an ultrasonic frequency vibration applied for a short period, e.g. a few minutes.

Advantageously, the fiber is subjected to vibrations while it is heated to a temperature close to, but lower than the softening point (in order that the fiber characteristics are not altered) and then is cooled down to room temperature. This promotes atom redistribution and allows operation at a lower frequency.

By using the method of the invention, the attenuation due to Rayleigh scattering is reduced, owing to relaxations induced in the molecular structure.

The method can be performed by very simple equipment, namely a furnace for heating the fiber to the desired temperature and an ultrasonic generator to make the fiber vibrate.

The method of the invention for reducing attenuation in an optical fiber thus comprises the steps of:

(a) heating an optical fiber to an elevated temperature below a softening temperature of the material of the optical fiber; and (b) vibrating the optical fiber while it is at the elevated temperature with an ultrasonic vibration to effect atomic redistribution in the optical fiber to a lower energy condition than the atoms possess prior to vibrating of the optical fiber, thereby reducing sizes of inhomogeneity domains in the material.

The optical fiber can be cooled from the elevated temperature to substantially room temperature and advantageous ultrasonic vibration is applied during the cooling as well.

The ultrasonic vibration which is used in accordance with the present invention can have a frequency of about 50 kHz to substantially 1 MHz. The period of application is preferably all of the order of several minutes, i.e. between 2 to 10 minutes, although even a few seconds of application of the ultrasonic vibration can be found to contribute to a lower energy level in the glass fiber after treatment and a corresponding reduction in the sizes of the inhomogeneity domains.

BRIEF DESCRIPTION OF THE DRAWING

The above and other objects, features and advantages of the present invention will become more readily apparent from the following description, reference being made to the accompanying drawing, the sole FIGURE of which is a diagram of an apparatus for carrying out the method of this invention.

SPECIFIC DESCRIPTION AND EXAMPLE

The single mode optical fiber F of the invention is drawn at 10 from a conventional composition and in a conventional manner having, for example, a minimum dispersion point close to 1.55 μm wavelength and a minimum dispersion point at about 1.27 μm.

The glass fiber is heated up to a temperature close to its softening point in a furnace 11 and ultrasonic stress is applied to the fiber as diagrammatically illustrated between a pair of supports 12 by a vibratile element 13 connected to an ultrasonic vibration generator 14. The duration of vibration is the entire period over which the fiber is in the furnace and can be about 3 minutes with an amplitude which is of the order of the diameter of the optical fiber and a frequency of 100 kHz.

The optical fiber is then subjected to cooling in a chamber 15 where a similar ultrasonic vibration unit 16 is effective to vibrate the fiber during cooling with essentially the same parameters. The optical fiber emerging at room temperature has a minimum attenuation point at substantially the minimum dispersion point in terms of wavelength apparently due to the reduction of Rayleigh scattering domains.

While the drawing shows the vibrating system to be in the fiber-drawing line, in this particular case a vibration time of a few seconds or less is preferred. Usually however, the vibration should be applied for at least several minutes, in which case a skein of preformed optical fiber can be drawn progressively through the furnace 11 and the cooling chamber 15 at the appropriate speed and these elements will be separated from the fiber-drawing system. Furthermore, the entire skein without unwinding can be treated with vibration in the furnace and cooling chamber as desired.

I claim:

1. A method of reducing attenuation in an optical fiber, comprising the steps of:
   (a) heating an optical fiber to an elevated temperature below a softening temperature of the material of said optical fiber; and
   (b) vibrating said optical fiber while it is at said elevated temperature with an ultrasonic vibration to effect atomic redistribution in said optical fiber to a lower energy condition than the atoms possess prior to vibrating of said optical fiber, thereby reducing sizes of inhomogeneity domains in said material.

2. The method defined in claim 1, further comprising the step of:
   (c) cooling the optical fiber from said elevated temperature to substantially room temperature.

3. The method defined in claim 2, further comprising the step of:
   (d) applying said ultrasonic vibration to said optical fiber during cooling thereof in step (c).

4. The method defined in claim 2 wherein said ultrasonic vibration is applied over a period of several minutes.

5. The method defined in claim 4 wherein said period is substantially 2 to 10 minutes and said ultrasonic vibration has a frequency of substantially 50 kHz to 1 MHz.

6. In a method of preparing an optical fiber for communications use, the improvement which comprises subjecting an optical fiber to an ultrasonic vibration at a temperature and for a duration sufficient to effect atomic redistribution in said optical fiber to a lower energy condition than the atoms possess prior to vibrating of said optical fiber, thereby reducing sizes of inhomogeneity domains in said material and reducing attenuation in light transmission through said optical fiber.

7. The improvement defined in claim 6 wherein said optical fiber is heated to an elevated temperature below its softening point while the ultrasonic vibration is applied thereto.

8. The improvement defined in claim 7, further comprising cooling the optical fiber from said elevated temperature to substantially room temperature.

9. The improvement defined in claim 8, further comprising applying said ultrasonic vibration to said optical fiber during cooling thereof.

10. The improvement defined in claim 9 wherein said ultrasonic vibration is applied over a period of several minutes 11. The improvement defined in claim 10 where n said period is substantially 2 to 10 minutes and said ultrasonic vibration has a frequency of substantially 20 kHz to 1 MHz.

* * * * *